United States Patent
Matsumoto

(10) Patent No.: US 10,159,046 B2
(45) Date of Patent: Dec. 18, 2018

(54) MOBILE TERMINAL DEVICE

(71) Applicant: KYOCERA CORPORATION, Kyoto (JP)

(72) Inventor: Hiroko Matsumoto, Osaka (JP)

(73) Assignee: KYOCERA CORPORATION, Kyoto (JP)

( * ) Notice: Subject to any disclaimer, the term of this patent is extended or adjusted under 35 U.S.C. 154(b) by 98 days.

(21) Appl. No.: 14/998,197

(22) Filed: Dec. 24, 2015

(65) Prior Publication Data

US 2016/0262097 A1 Sep. 8, 2016

Related U.S. Application Data

(63) Continuation of application No. PCT/JP2014/066986, filed on Jun. 26, 2014.

(30) Foreign Application Priority Data

Jun. 26, 2013 (JP) ................................. 2013-134316

(51) Int. Cl.
*H04W 52/02* (2009.01)
*H04M 1/725* (2006.01)
*H04M 1/67* (2006.01)

(52) U.S. Cl.
CPC ..... *H04W 52/027* (2013.01); *H04M 1/72563* (2013.01); *H04M 1/72569* (2013.01); *H04M 1/67* (2013.01); *H04M 2250/22* (2013.01); *Y02D 70/00* (2018.01)

(58) Field of Classification Search
None
See application file for complete search history.

(56) References Cited

U.S. PATENT DOCUMENTS

2003/0188172 A1* 10/2003 Yeh .................. G06F 21/81
  713/189
2012/0154303 A1* 6/2012 Lazaridis ........... G06F 1/3203
  345/173

(Continued)

FOREIGN PATENT DOCUMENTS

JP 2003-037656 A 2/2003

OTHER PUBLICATIONS

International Search Report in International Application No. PCT/JP2014/066986, dated Sep. 2, 2014, in 2 pages.

*Primary Examiner* — Lonnie V Sweet
(74) *Attorney, Agent, or Firm* — Duane Morris LLP

(57) ABSTRACT

A mobile terminal device includes a display module configured to turn on and display information, a touch detection module including a touch panel and being configured to detect a touch operation of a user with respect to the touch panel, and a processor configured to control the display module and touch detection module. The processor is configured to turn off a turned-on display module when an object approaches the display module in a case where an application program accompanied by information display is being executed, and disable the touch operation after turning off the display module in a case where the application program corresponds to a first application program, and enable the touch operation after turning off the display module in a case where the application program corresponds to a second application program.

8 Claims, 8 Drawing Sheets

(56) References Cited

U.S. PATENT DOCUMENTS

| | | | | |
|---|---|---|---|---|
| 2012/0172085 A1* | 7/2012 | Vuppu | ............... | H04W 52/027 455/556.1 |
| 2012/0260220 A1* | 10/2012 | Griffin | ................ | G06F 3/033 715/863 |
| 2012/0293474 A1* | 11/2012 | Sun | ................ | G01J 1/0488 345/207 |
| 2013/0017814 A1* | 1/2013 | Ali | ................ | G06F 1/1626 455/418 |
| 2013/0235704 A1* | 9/2013 | Grinberg | ............... | G04G 21/08 368/69 |
| 2017/0082651 A1* | 3/2017 | Liou | ................ | G01D 3/10 |
| 2018/0143217 A1* | 5/2018 | Liou | ................ | G01P 13/00 |

* cited by examiner

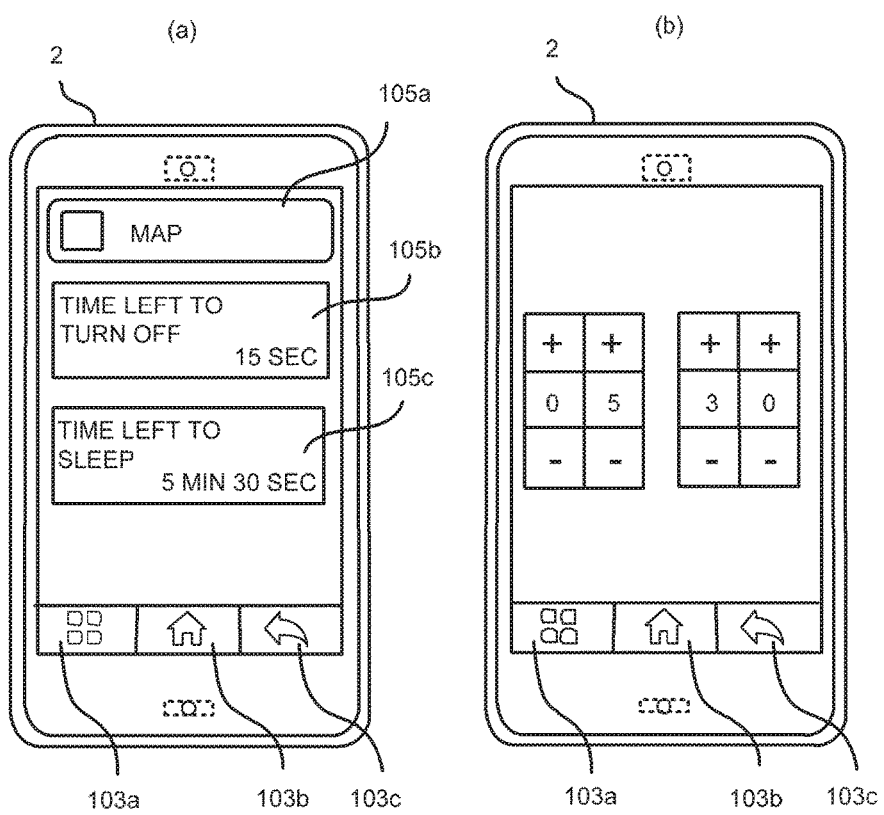

MOBILE TERMINAL DEVICE

CROSS-REFERENCE TO RELATED APPLICATION

The present application is a continuation of International Application No. PCT/JP2014/066986, filed on Jun. 26, 2014, which claims the benefit of Japanese Application No. 2013-134316, filed on Jun. 26, 2013. International Application No. PCT/JP2014/066986 is entitled "Portable Terminal Device", and Japanese Application No. 2013-134316 is entitled "Mobile Terminal Device," and each are incorporated by reference herein in their entireties.

FIELD

The present disclosure relates to mobile terminal devices such as a mobile phone, a PDA (Personal Digital Assistant), a tablet PC, an electronic book terminal, and the like.

BACKGROUND

There has been a mobile terminal device such as a mobile phone which turns on a back light of a display module and then turns off the back light after a certain period of time to reduce power consumption.

SUMMARY

A mobile terminal device of one embodiment includes a display module configured to turn on and display information, a touch detection module including a touch panel and being configured to detect a touch operation of a user with respect to the touch panel and a processor configured to control the display module and the touch detection module. The processor turns off the turned-on display module when an object approaches the display module in a case where an application program accompanied by information display. The processor disables a touch operation performed after turning off in a case where the application program corresponds to a first application program. The processor enables a touch operation performed after turning off in a case where the application program corresponds to a second application program.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a diagram representing one example of a time period setting screen of the mobile terminal device according to the first or second embodiment.

DETAILED DESCRIPTION

Hereinafter, embodiments will be described with reference to the drawings.

With mobile terminal devices of background art, there is a case where it would be inconvenient for a user when the user always must wait for a certain period of time until a back light is turned off. For example, in the case where a user must suddenly step away from a seat while leaving a mobile terminal device on a desk, if a back light remains in the on-state for a certain period of time, power is consumed by the amount corresponding to the time. Therefore, a mobile terminal device capable of reducing power consumption may be desired.

A mobile terminal device according to an embodiment can turn off a turned-on display module when an object approaches the display module in a case where an application program accompanied by information display is executed. For example, in a case where a user places the mobile terminal device on a desk and checks a received mail, when the user covers a front side (upper side) of a display module with a hand, the mobile terminal device can detect an approach of an object to the display module and turn off the turned-on display module. According to this mobile terminal device, a user can turn off the display module by covering the front side of the display module with a hand at an intended timing rather than waiting for the display module to be turned off. A user can readily turn off the turned-on display module through a simple operation of covering the front side (upper side) of the display module of the mobile terminal device with a hand rather than, for example, a troublesome operation of pressing a power button every time. According to a mobile terminal device according to an embodiment, power consumption can be reduced.

It should be noted that the mobile terminal device described hereinafter is, as one example, a mobile phone, and more specifically a smart phone. However, the embodiments can be applied to any mobile terminal devices such as a PDA, a tablet PC, and the like.

First Embodiment

Firstly, a mobile phone will be described which is a mobile terminal device according to a first embodiment.

<External Appearance of Mobile Phone>

Figure 1:
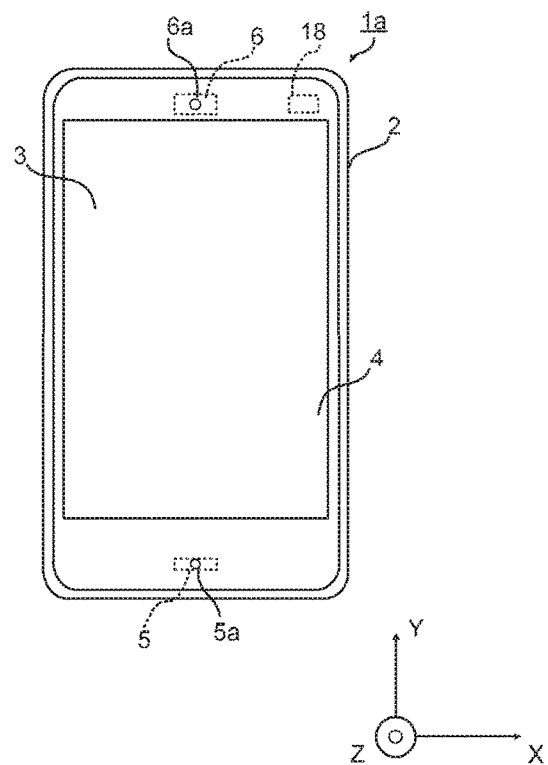
FIG. 1 is a front view representing an external appearance of a mobile terminal device according to a first embodiment.
Figure 2:
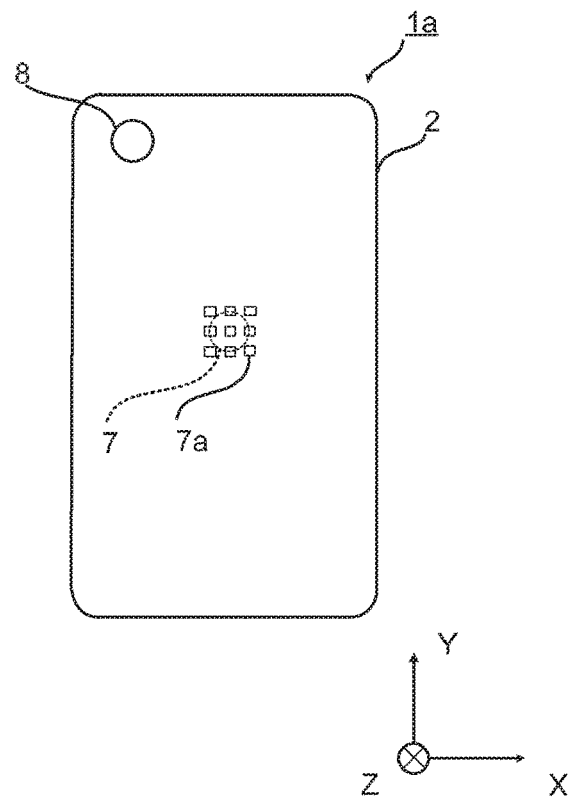
FIG. 2 is a rear view representing an external appearance of the mobile terminal device according to the first embodiment.

FIGS. 1 and 2 respectively show a front view and a rear view representing an external appearance of a mobile phone 1a. Hereinafter, for ease of description, a longitudinal direction of a case 2 is defined as a Y-direction, and a short direction of case 2 is defined as an X-direction, as shown in FIGS. 1 and 2. A "front side of display module" refers to a front side in a Z-direction shown in FIGS. 1 and 2, in other words a display side of mobile phone 1a.

As shown in FIGS. 1 and 2, mobile phone 1a includes case 2, a display 3, a touch panel 4, a microphone 5, a phone call speaker 6, an external speaker 7, and an image-capturing lens 8.

Case 2 can have a substantially rectangular outline viewed from a front side. Display 3 can be located on the front side of case 2. Display 3 is, for example, a liquid crystal display. Display 3 may be a display other than the liquid crystal display. For example, it may be an organic electroluminescence display.

On the front side of case 2, a touch panel 4 is located so as to cover display 3. Touch panel 4 can be formed to be a transparent sheet. As touch panel 4, a touch panel of various types can be used, such as an electrostatic capacitance type, an ultrasonic wave type, a pressure-sensitive type, a resistance film type, an optical detection type, or the like.

In case 2, microphone 5 can be located at a lower end portion. Microphone 5 can receive voice which has passed through a microphone hole 5a formed in the front side of case 2. Microphone 5 can generate an electrical signal corresponding to an inputted sound. In case 2, a phone call speaker 6 can be located at an upper end portion. Phone call speaker 6 can output a sound. The outputted sound can be emitted to outside of case 2 through an output hole a formed in the front side of case 2. At the time of making a phone call, a received voice received from equipment (a mobile phone or the like) on a communication destination can be outputted from phone call speaker 6, and an uttered voice given by a user can be inputted to microphone 5. It should be noted that the sound includes various sound such as a voice, an alarming sound, and the like.

External speaker 7 can be located in case 2. On the back side of case 2, output holes 7a can be formed in a region facing external speaker 7. A sound outputted from external speaker 7 can be emitted to outside of case 2 through output holes 7a. On the back side of case 2, image-capturing lens 8 of an image-capturing module, which will be described later, can be exposed.

<Electrical Configuration of Mobile Phone>

Figure 3:
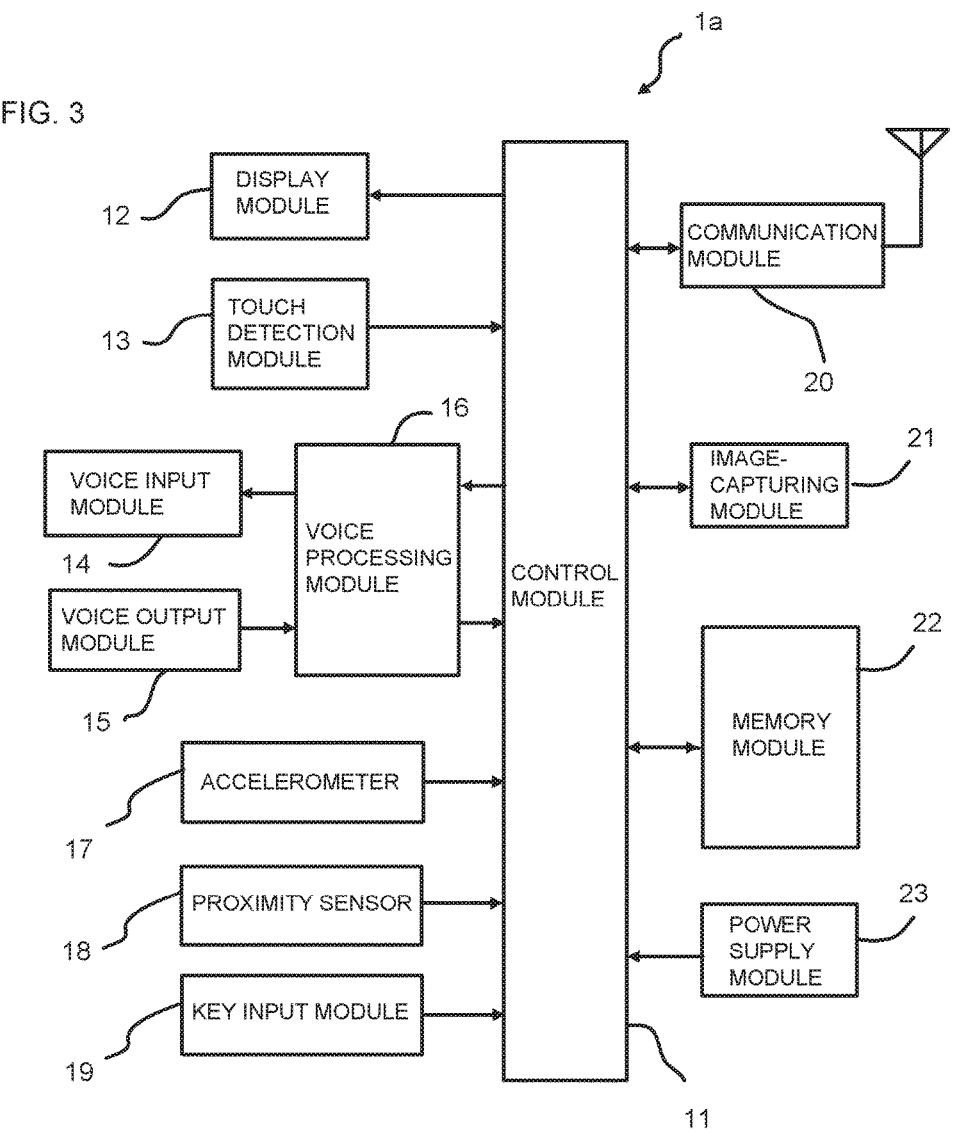
FIG. 3 is a block diagram mainly representing an electrical configuration of the mobile terminal device according to the first embodiment.

FIG. 3 is a block diagram mainly representing an electrical configuration of mobile phone 1a. As shown in FIG. 3, mobile phone 1a includes a control module 11, a display module 12, a touch detection module 13, a voice input module 14, a voice output module 15, a voice processing module 16, an accelerometer 17, a proximity sensor 18, a key input module 19, a communication module 20, an image-capturing module 21, a memory module 22, and a power supply module 23.

Control module 11 includes a CPU (Central Processing Unit). Control module 11 can control each module (display module 12, touch detection module 13, voice input module 14, voice output module 15, voice processing module 16, accelerometer 17, proximity sensor 18, key input module 19, communication module 20, image-capturing module 21, memory module 22, and the like) constituting mobile phone 1a in accordance with a program stored in memory module 22.

Display module 12 can include display 3 shown in FIG. 1. Display 3 displays an image (screen) based on a control signal and an image signal from control module 11. Display module 12 can include a back light source in a case where display 3 is a liquid crystal display. In the case where display 3 is a liquid crystal display, turning off display module 12 refers to not allowing the back light source to illuminate.

Touch detection module 13 can include touch panel 4 shown in FIG. 1. Touch detection module 13 can detect a touch operation of a user with respect to display 3 by means of touch panel 4. Touch detection module 13 can detect a position touched by a user (hereinafter, referred to as "touch position") when the user touches touch panel 4. Touch detection module 13 can output a position signal generated based on the detected touch position to control module 11.

Since touch panel 4 is located on display 3, a user can perform various touch operations by touching touch panel 4 with a finger while visually confirming display 3. The touch operations include a tap operation, a flick operation, a sliding operation, a drag operation, and the like. The tap operation is an operation in which a user touches touch panel 4 with a finger and thereafter leaves the finger from touch panel 4 in a short period of time. The flick operation is an operation in which a user touches touch panel 4 with a finger and thereafter flick touch panel 4 in any direction. The sliding operation is an operation in which a user keeps a finger in contact with touch panel 4 and moves the finger in any direction. The drag operation is an operation in which a user performs the sliding operation to a moved object such as an icon and thereafter leaves a finger from touch panel 4.

For example, in a case where touch detection module 13 detects a touch position, when the touch position is not detected within a predetermined first time period from detection of the touch position, control module 11 can determine that the touch operation is the tap operation. In a case where a touch position is moved by a predetermined first distance or longer within a predetermined second time period from detection of the touch position, and thereafter the touch position is not detected, control module 11 can determine that the touch operation is the flick operation. When a touch position is detected, and thereafter the touch position is moved by a predetermined second distance or longer, control module 11 can determine that the touch operation is the sliding operation.

Voice input module 14 can include microphone 5. Voice input module 14 can output an electrical signal from microphone 5 to voice processing module 16.

Voice output module 15 can include phone call speaker 6 and external speaker 7. An electrical signal from voice processing module 16 can be inputted to voice output module 15. Voice output module 15 can allow phone call speaker 6 or external speaker 7 to output sound.

Voice processing module 16 can apply A/D conversion and the like to an electrical signal from voice input module 14 and output a converted digital sound signal to control module 11. Voice processing module 16 can apply decode processing, D/A conversion, and the like to the digital sound signal from control module 11 and output the converted electrical signal to voice output module 15.

Accelerometer 17 is, for example, a 3-axis acceleration sensor, and can detect, for each of three detection axes which are orthogonal to each other, acceleration in a direction along the detection axis and output the same to control module 11.

Proximity sensor 18 is, for example, an infrared ray proximity sensor and can output a detection signal when a detected object approaches within a predetermined distance. This detection signal can be inputted to control module 11. When mobile phone 1*a* is viewed from the front side of case 2, proximity sensor 18 is located on a back side of the upper end portion of case 2, as shown in FIG. 1. Accordingly, a detection signal can be outputted from proximity sensor 18 when a person's head or the like approaches case 2. In other words, when a detected object approaches the front side (display module 12) of mobile phone 1*a*, a detection signal can be outputted from proximity sensor 18. It should be noted that, in order to avoid a situation in which proximity sensor 18 outputs a detection signal when a user's finger or the like approaches touch panel 4 for a usual touch operation such as a character input, proximity sensor 18 is preferably located at, for example, an upper end portion of case 2 or the like as shown in FIG. 1.

Key input module 19 can include at least one or more hard key (not shown). For example, key input module 19 can include a power key for turning on a power of mobile phone 1*a*. When at least one key of various hard keys located on mobile phone 1*a* is pressed, key input module 19 can output a signal corresponding to the pressed hard key to control module 11.

Communication module 20 includes a circuit for converting a signal, an antenna for transmitting and receiving a radio wave, and the like to perform a phone call and a communication. Communication module 20 can convert a signal for a phone call and a communication inputted from control module 11 into a radio signal, and transmit the converted radio signal to a communication destination such as a base station or other communication device via the antenna. Further, communication module 20 can convert the radio signal received via the antenna into a signal in a form which can be utilized by control module 11 and output the converted signal to control module 11.

Image-capturing module 21 is constituted of image-capturing lens 8, an image-capturing element, and the like, and can capture a static image and a moving image based on a control by control module 11. As shown in FIG. 2, since image-capturing lens 8 is located on the back side of mobile phone 1*a*, it can capture an image of an object which is present on the back side of mobile phone 1*a*.

Memory module 22 can include a ROM (Read Only Memory), a RAM (Random Access Memory), and an external memory. Various programs can be stored in memory module 22. The programs stored in memory module 22 can include a control program for controlling each module of mobile phone 1*a* as well as various types of application programs (for example, home, phone call, E-mail, web browser, a map, a game, a schedule management, and the like). The programs can be stored in memory module 22 at the time when mobile phone 1*a* is manufactured by a manufacturer, or can be stored in memory module 22 through a communication network or a storage medium such as a memory card, a CD-ROM, or the like.

Memory module 22 can also include a working area for storing data which is temporarily utilized or generated at the time of executing a program.

Power supply module 23 can include a battery and a residual capacity detection module. Power supply module 23 can supply power of a battery to control module 11 and each module other than control module 11. Power supply module 23 can supply power from an external power supply to a battery to charge the battery. Further, power supply module 23 can output a detection signal, which corresponds to a residual capacity of a battery detected by the residual capacity detection module, to control module 11.

<Operation of Mobile Phone>

Figure 4:
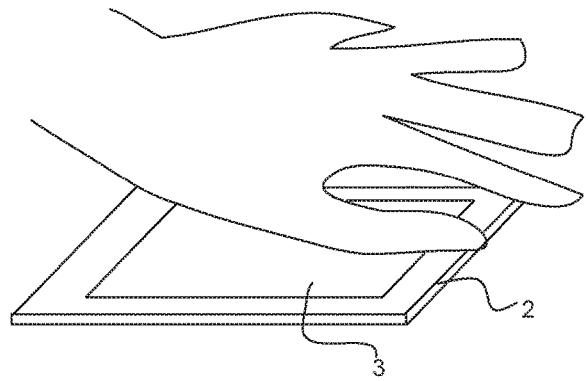
FIG. 4 is a diagram for illustrating an operation of a user to turn off a mobile terminal device.

In mobile phone 1*a*, when the front side of display module 12 is covered with a hand (FIG. 4), turned-on display module 12 is turned off. Hereinafter, it will be described in detail.

Figure 5:
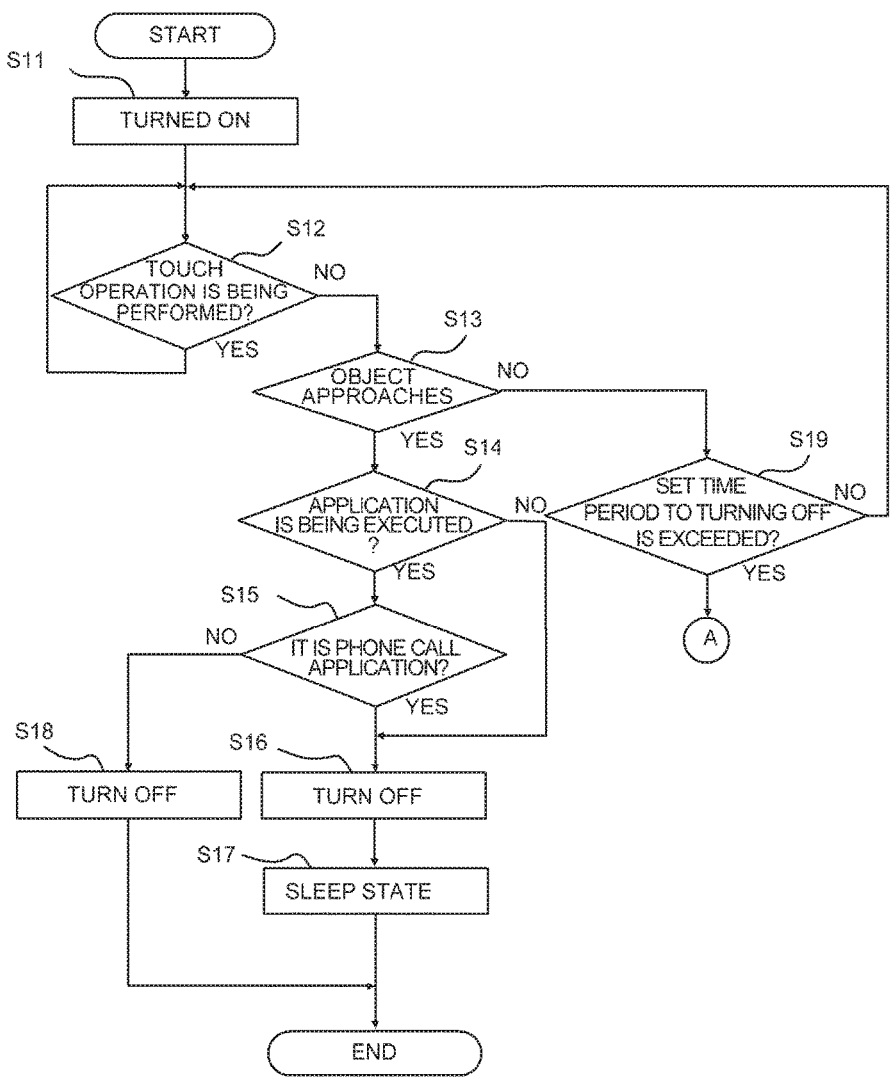
FIG. 5 is a flowchart for illustrating a turn-off control of the mobile terminal device according to the first embodiment.
Figure 6:
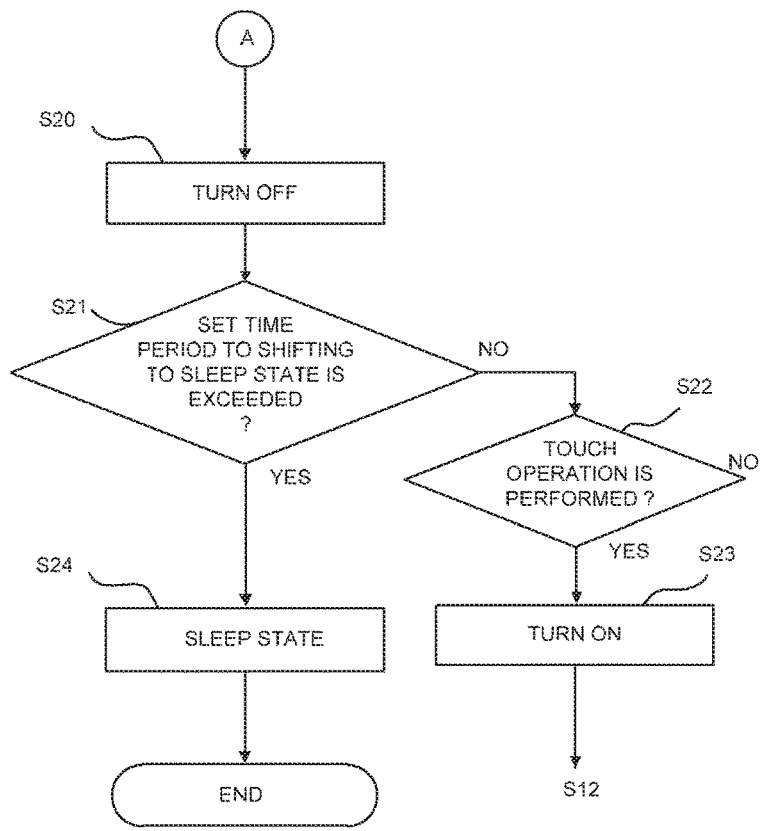
FIG. 6 is a flowchart for illustrating a turn-off control of the mobile terminal device according to the first embodiment.

FIGS. 5 and 6 are flowcharts for illustrating a turn-off control of mobile phone 1*a*. As shown in FIGS. 5 and 6, when display module 12 is turned on in Step S11, control module 11 of mobile phone 1*a* can firstly determine whether or not the touch operation is being performed (whether or not the touch operation is detected by touch detection module 13) (S12). Control module 11 repeats the processing of S12 until it determines that the touch operation is not being performed (S12: YES).

When control module 11 determines that the touch operation is not being performed (S12: NO), it can determine whether or not an object approaches display module 12 in accordance with a detection result by a proximity sensor 18 (S13). For example, when a detection signal is outputted from proximity sensor 18 upon covering display module 12 with a hand, control module 11 can determine that an object approaches display module 12 of mobile phone 1*a* (S13: YES).

When control module 11 determines that an object approaches display module 12 (S13: YES), it can determine whether or not an application program (hereinafter, simply referred to as "application") accompanied by information display is being executed (S14). When the application accompanied by the information display is executed, information is displayed on the display module 12. The application accompanied by information display can include a phone call application, a mail application, a map application, a web browser application, and the like.

When control module 11 determines that the application accompanied by information display is being executed (S14: YES), control module 11 can determine whether or not the application being executed is a phone call application (S15).

When control module 11 determines that the application being executed is the phone call application (S15: YES), control module 11 can allow turned-on display module 12 to be turned off (S16) and shift mobile phone 1*a* into a sleep state (S17). In the sleep state, display module 12 is turned off, and even when a user performs the touch operation to touch panel 4, control module 11 can disable the touch operation. The phrase "to disable touch operation" includes the case where the touch operation to touch panel 4 performed by a user does not cause touch detection module 13 to output a position signal to control module 11 in the first place, and the case where even an output of the position signal by touch detection module 13 to control module 11 does not cause control module 11 to perform processing in accordance with the signal (determined as invalid).

In Step 14, when control module 11 determines that the application accompanied by information display is not being executed (S14: NO), such as in the case of a standby state for example, it can allow turned-on display module 12 to be turned off (S16) and shift mobile phone 1*a* into the sleep state (S17).

When control module 11 determines that the application being executed is not the phone call application (S15: NO), it can allow turned-on display module 12 to be turned off (S18) and not to be shifted to the sleep state. In other words, when a user performs the touch operation to touch panel 4, control module 11 determines the touch operation as being valid and can execute a predetermined processing in accordance with the touch operation.

In Step 13, when control module 11 determines that an object does not approach display module 12 (S13: NO), control module 11 can determine whether or not an elapsed time period from turning on display module 12 has exceeded a first set time period (S19). A user can set this first set time period in advance at a setting screen or the like. When control module 11 determines that the elapsed time period has not exceeded the first set time period (S19: NO), it returns to Step 12 and repeats the processing.

On the other hand, as shown in FIG. 6, when control module 11 determines that the elapsed time period has exceeded the first set time period (S19: YES), control module 11 can allow display module 12 to be turned off (S20). Then, control module 11 can determine whether an elapsed time period from turning off display module 12 has exceeded a second set time period (S21). When the elapsed time period has not exceeded the second set time period (S21: NO), control module 11 can determine whether or not the touch operation to touch panel 4 is performed (S22). When not touch operation to touch panel 4 is performed (S22: NO), control module 11 returns to Step 21 and repeats the processing. When the touch operation to touch panel 4 is performed (S22: YES), control module 11 can turn on display module 12 (S23) and repeats the processing of Step 12 of FIG. 5 and subsequent steps. On the other hand, when the elapsed time period has exceeded the second set time period (S21: YES), control module 11 can shift mobile phone 1a into the sleep state (S24). It should be noted that the second set time period can be set by a user. It also should be noted that the second set time period may be or may not be the same as the first set time period.

Figure 7:
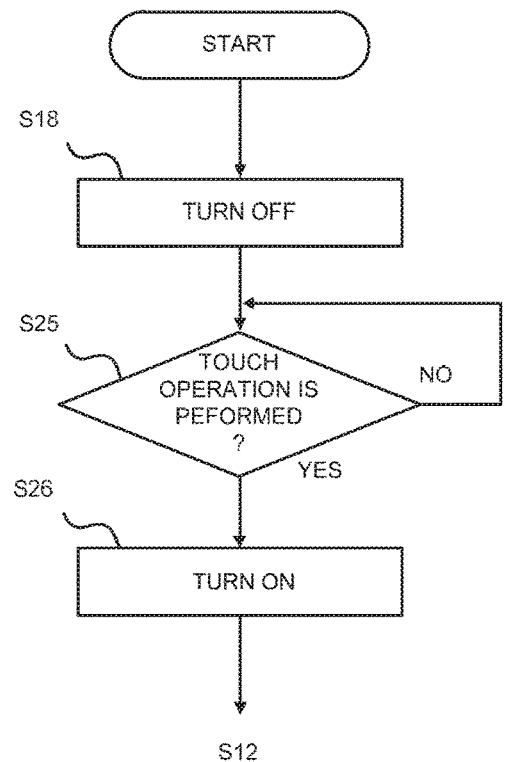
FIG. 7 is a flowchart for illustrating a turn-on control of the mobile terminal device according to the first embodiment.

As shown in FIG. 7, after display module 12 is turned off in Step 18, control module 11 can determined whether or not the touch operation to touch panel 4 is performed (S25). When control module 11 determines that the touch operation to touch panel 4 is performed (S25: YES), control module 11 can turn on display module 12 (S26) and repeats the processing of Step 12 of FIG. 5 and subsequent steps. Control module 11 repeats Step 25 until it determines that the touch operation is performed (S25: NO).

According to mobile phone 1a described above, when the application program accompanied by information display is being executed, and the front side of display module 12 of mobile phone 1a is covered with a hand, proximity sensor 18 can detect an approach of a hand to display module 12. When control module 11 determines that an object approaches display module 12 based on the detection result of proximity sensor 18, it can allow turned-on display module 12 to be turned off. According to mobile phone 1a, a user can turn off display module 12 by covering the front side of display module 12 with a hand at an intended timing rather than waiting until display module 12 is turned off. Accordingly, an increase in power consumption due to display module 12 maintaining its turned-on state can be reduced. Turned-on display module 12 can be readily turned off through a simple operation of covering the front side of display module 12 of mobile phone 1a with a hand.

According to mobile phone 1a, by turning off display module 12 at a timing intended by a user, information having been visually confirmed by a user would be difficult to be visually confirmed or cannot be visually confirmed. Therefore, it can prevent the information from being viewed by other person before display module 12 is turned off.

According to above-described mobile phone 1a, also in the case where a user covers the front side of display module 12 with a hand to turn off display module 12, it would not be shifted to the sleep mode. Therefore, the touch operation to touch panel 4 by a user can be enabled. Accordingly, when a user finishes a thing to do and would like to confirm information again, or when a user turns off display module 12 by mistake, the touch operation to touch panel 4 can turn on display module 12 immediately.

It should be noted that when mobile phone 1a is executing the phone call application (during a phone call), and an object approaches display module 12, it is turned off and shifted into the sleep state. Since a user places mobile phone 1a close to a face during a phone call, it prevents touch detection by touch detection module 13 due to display module 12 in contact with the face and subsequent operation in accordance with the touch. It should be noted that, as to this sleep state, when display module 12 leaves apart from a face (when control module 11 determines that no object is present near display module 12 in accordance with the detection result of proximity sensor 18), display module 12 may be turned on and the sleep state may be released.

It should be noted that, although in the description above it is illustrated that control module 11 allows turned-on display module 12 to be turned off and allows mobile phone 1a into the sleep state when, for example in the case of the standby state, control module 11 determines that the application accompanied by information display is not being executed, turned-on display module 12 can only be turned off without shifting to the sleep state, and the touch operation can be enabled.

It should be noted that, although in the present embodiment it was illustrated that display module 12 is turned off and shifted to the sleep state when an object approaches display module 12 in the case where mobile phone 1a is executing the phone call application, such application is not limited to the phone call application and may include other application. As described above, in the application accompanied by information display, the application which causes display module 12 to be turned off and shifted to the sleep mode when an object approaches display module 12 during execution corresponds to a first application, and the application which only causes display module 12 to be turned off and not shifted to the sleep mode when an object approaches display module 12 during execution corresponds to a second application.

Figure 8:
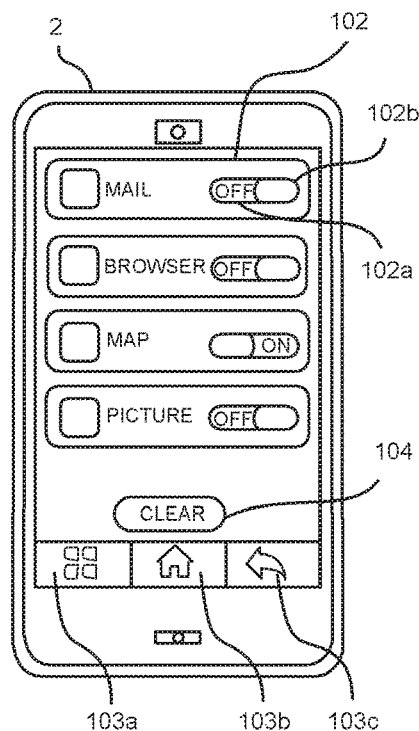
FIG. 8 is a diagram representing one example of a second application selection screen of the mobile terminal device according to the first embodiment.

It may be so configured that a user can appropriately set applications corresponding to the first application and the second application. FIG. 8 is a diagram representing one example of a second application selection screen for selecting an application corresponding to the second application. As shown in FIG. 8, the second application selection screen includes a selection object 102 corresponding to each candidate. In the example of FIG. 8, the applications as candidates include a mail application, a browser application, a map application, and a picture application.

It should be noted that an operation key group 103 is displayed in a lower portion of the second application selection screen. Operation key group 103 includes a setting key 103a, a home key 103b, and a back key 103c. Setting key 103a is a key mainly for allowing display 3 to display a setting screen for performing various settings. Home key 103b is a key mainly for shifting display of display 3 from other screen to a home screen. Back key 103c is a key mainly for returning executed processing to previous processing by one step. Display of operation key group 103 is merely for illustration, and any operation key may be omitted, and other operation key may be displayed.

Each selection object 102 has a setting lever 102a. In an initial state, all of candidate applications are set to be off, in other words, set to be the first application. In all of selection objects 102, tab portions 102b are located on the right region of setting levers 102a. At this time, setting lever 102a displays "OFF." When a user sets an application in an off-setting to an on-setting (setting an application corresponding to the first application to be the second application), the user, as an on-setting operation, moves tab portion 102b by the drag operation from the right side region of setting lever 102a to the left side region. At this time, setting lever 102a displays "ON." In FIG. 8, the map application is set as the second application, and other applications are set as the first application.

The second application selection screen may include a clear button 104 which clears all of selections. A user can clear all of the selection by touching this clear button 104 and set all of the applications to be initial setting, in other words, to be the first application.

It should be noted that all of candidate applications may be initially in the on-state, in other words, may be set as the second application, and a user may select applications to be set as the first application.

Modified Example 1

Figure 9:
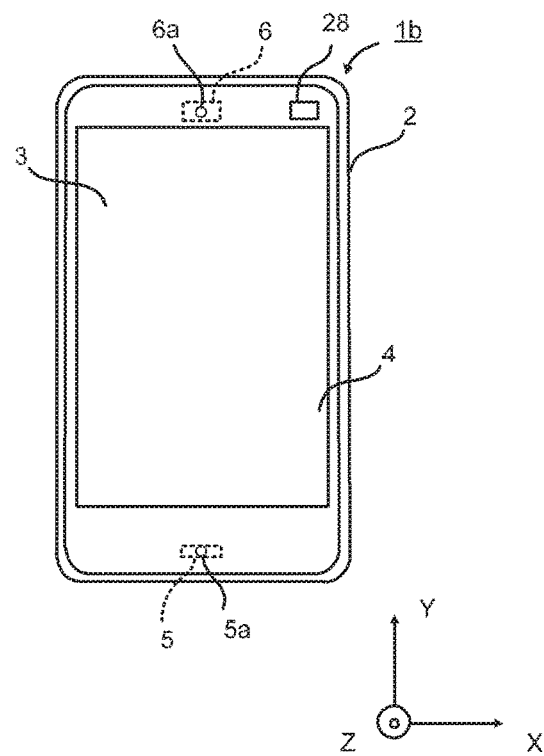
FIG. 9 is a front view representing an external appearance of a mobile terminal device according to a second embodiment.
Figure 10:
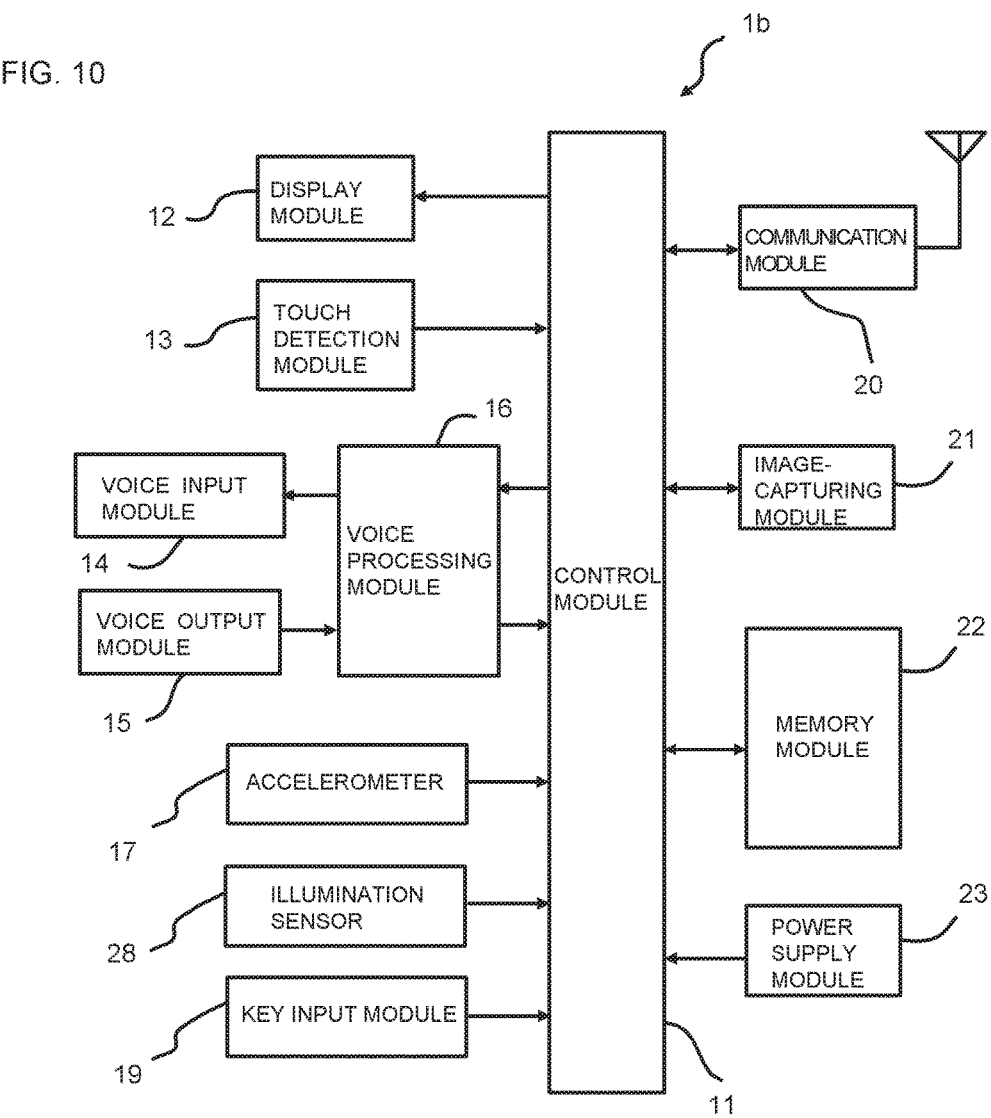
FIG. 10 is a block diagram mainly representing an electrical configuration of the mobile terminal device according to the second embodiment.

In order to detect presence of an object near display module 12, an illumination sensor may be used in place of proximity sensor 18. FIG. 9 is a front view representing an external appearance of a mobile phone 1b utilizing the illumination sensor, and FIG. 10 is a block diagram mainly representing an electrical configuration of mobile phone 1b. It should be noted that, in mobile phone 1b, the same reference numerals are allotted to configuration similar to those of mobile phone 1a, and description thereof will be omitted.

As shown in FIG. 9, an illumination sensor 28 is located on the same plane as display module 12. Illumination sensor 28 can detect brightness near display module 12 as illumination. It should be noted that since a rear view of mobile phone 1b is similar to that of mobile phone 1a, illustration will be omitted.

The flowchart for illustrating the turn-off control of mobile phone 1b is similar to the flowchart shown in FIG. 5 for illustrating the turn-off control of mobile phone 1a. However, in mobile phone 1b, in Step 13, control module 11 can determine whether or not illumination is lowered to a predetermined level in accordance with a detection result of illumination sensor 28. For example, when the front side of display module 12 is covered with a hand, and an illumination value detected by illumination sensor 28 becomes less than or equal to a predetermined threshold value, it can be determined that the illumination is lowered to a predetermined level (S13: YES).

When control module 11 determines that the illumination is lowered to the predetermined level (S13: YES), it can determine whether or not an application accompanied by information display is being executed (S14). Other processing is similar to the turn-off control of mobile phone 1a.

Modified Example 2

Figure 11:
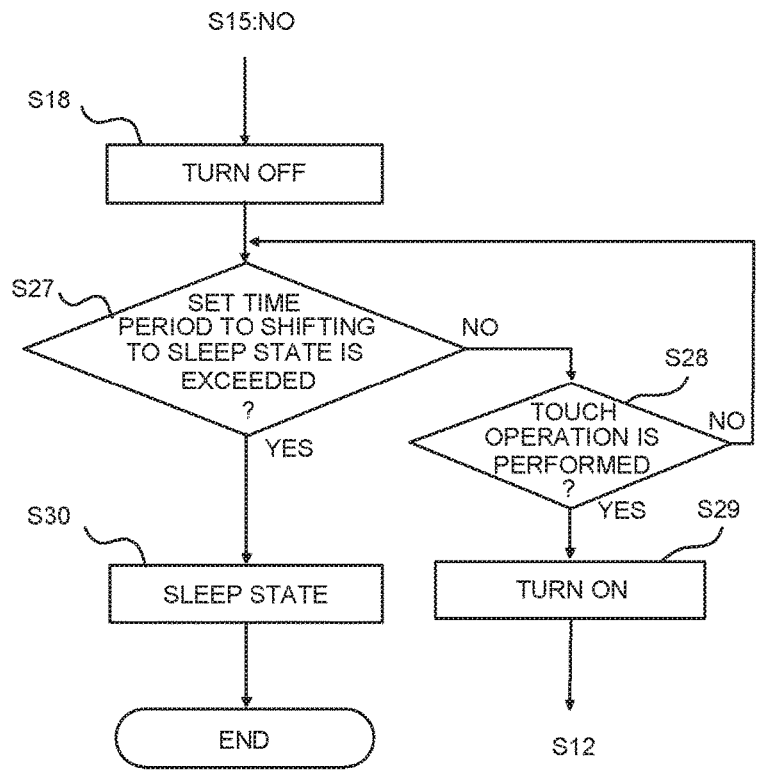
FIG. 11 is a flowchart for illustrating a modified example of a turn-off control of the mobile terminal device according to the first or second embodiment.

When an application program being executed is an application other than the call application, and a predetermined time period passes after turning off display module 12, control module 11 in mobile phone 1a and mobile phone 1b can shift to the sleep state and disable the touch operation to touch panel 4. FIG. 11 is a flowchart for illustrating the turn-off control in mobile phones 1a, 1b in such case. As shown in FIG. 11, when display module 12 is turned off in Step S18, control module 11 can determine whether or not an elapsed time period from turning off has exceeded a third set time period (S27). A user can set this third set time period in advance at the setting screen or the like. It should be noted that the third set time period may be or may not be the same as the first set time period or the second set time period.

When the elapsed time period has not exceeded the third set time period (S27: NO), control module 11 can determine whether or not the touch operation to touch panel 4 is performed (S28). When the touch operation to touch panel 4 is not present (S28: NO), control module 11 can return to Step 27 and repeat processing. When the touch operation to touch panel 4 is present (S28: YES), control module 11 can allow display module 12 to be turned on (S29), and repeat the processing of Step 12 of FIG. 5 and subsequent processing. On the other hand, when the elapsed time period has exceeded the third set time period (S27: YES), control module 11 can allow mobile phones 1a, 1b to shift into the sleep state (S30).

In Modified Example 2, after the mobile phone is shifted into the sleep state, display module 12 is not turned on even if a user touches display module 12. However, until it is shifted into the sleep state, display module 12 can be turned on by touching display module 12.

According to this Modified Example 2, in such a case where a user considers that a thing to do would be finished soon and turns on display module 12, and the thing to do is extended and the user cannot confirm display module 12, the mobile phone is automatically shifted to the sleep state. Therefore, power consumption can be reduced.

It should be noted that such processing is not always necessary to be performed for all of applications other than the call application. For example, during execution of an application containing a content which a user would not like to be known to other person, such as a mail application or a schedule application, only when detection of a detected object is performed by the proximity sensor, and display module 12 is turned off, the processing of shifting into the sleep state at the time of elapse of a predetermined time period from turning off display module 12 may be performed. The application in which the processing illustrated in this Modified Example 2 can be optionally set by a user. The time period from turning off display module 12 to shifting to the sleep state can be set by a user for each application.

Second Embodiment

Next, a second embodiment will be described. A mobile phone as a mobile terminal device of the present embodiment does not turn off a display module soon even when an object approaches the display module in a case where a character input application is being executed. Detailed description will made hereinafter. It should be noted that a configuration of a mobile phone as a mobile terminal device of the present embodiment is similar to that of mobile phones 1a, 1b, thus illustration by drawing and description will be omitted.

Figure 12:
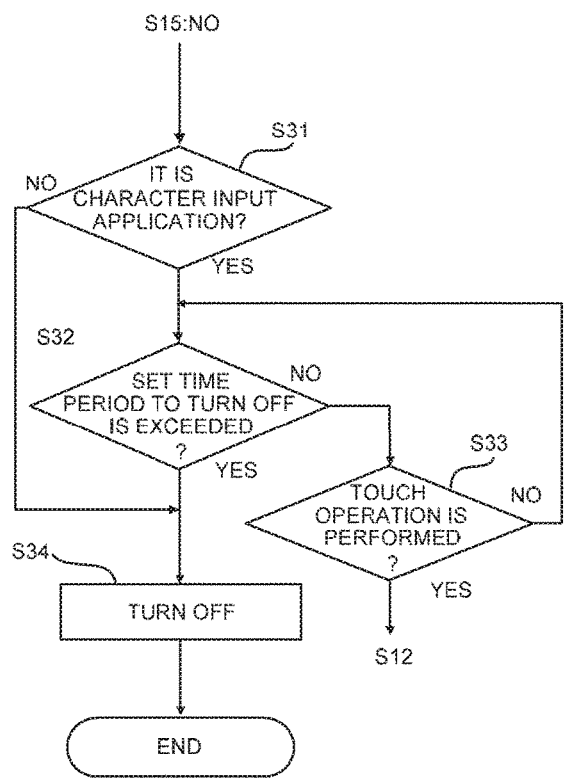
FIG. 12 is a flowchart for illustrating a modified example of a turn-off control of the mobile terminal device according to the first or second embodiment.

FIG. 12 is a flowchart for illustrating a turn-off control of the mobile phone according to the present embodiment. In FIG. 12, portions which are different from the flowchart of FIG. 5 are shown. As shown in FIG. 12, in Step 15, when control module 11 determines that an application being executed is not a phone call application (S15: NO), it can determine whether or not the application being executed is a character input application (S31). When control module 11 determines that the application being executed is not the character input application (S31: NO), control module 11 can allow display module 12 to be turned off. On the other hand, when control module 11 determines that the application being executed is the character input application (S31: YES), it determines that an object approaches, and determines whether or not an elapsed time period from detection of an approach of an object to display module 12 has exceeded a fourth set time period (S32).

When control module 11 determines that the elapsed time period has not exceeded the fourth set time period (S32: NO), it can determine whether or not the touch operation to touch panel 4 is performed (S33). When control module 11 determines that the touch operation to touch panel 4 is performed (S33: YES), control module 11 can return to Step 12 of FIG. 5 and repeat the processing of Step 12 and subsequent steps. On the other hand, when control module 11 determines that the touch operation is not performed (S33: NO), control module 11 can return to Step 32 and continue the processing.

When control module 11 determines that the elapsed time period has exceeded the fourth set time period (S32: YES), it can allow display module 12 to be turned off (S34). It should be noted that the fourth set time period can be set by a user. It also should be noted that the fourth set time period may be or may not be the same as the first set time period, the second set time period, or the third set time period.

According to the mobile phone of the second embodiment, in the case where the character input application is executed, even when an object approaches display module 12, display module 12 is not turned off soon. Display module 12 can be turned off when the touch operation is not performed within a predetermined period from detection of an approach of an object to display module 12. Accordingly, when a user attempts to perform a character input operation and places a hand close to display module 12, it can prevent the display module from being erroneously turned off.

It should be noted that, although the character input application is illustrated in the present embodiment, such processing may be applied to other applications. A user can designate a specific application from a menu screen or the like, and set the display module not to be turned off soon even when an object approaches the display module during execution of the application. Accordingly, a user prevent the display module from being erroneously turned off for a specific application which would be bothering when frequently turned off.

It should be noted that, when a user can set the time period from detection of an approach of an object to display module 12 to turning off display module 12, the user can set the time period with the setting screen shown in FIG. 13, for example. In this setting screen, a user can also set the time period from turning off display module 12 to shifting to the sleep state with the same screen.

For example in the selection screen shown in FIG. 8, when a user selects one application (which is a map application) as the second application, the setting screen of FIG. 13(a) can be displayed. The setting screen of FIG. 13(a) includes a first area 105a indicating a kind of the second application, a second area 105b displaying information related to a time period from detection of an approach of an object to display module 12 to turning off (hereinafter, also referred to as a first time period) for the application displayed in first area 105a, and a third area 105c displaying information related to a time period from turning off display module 12 to shifting to the sleep state (hereinafter, also referred to as a second time period). Here, for the map application, the first time period is set to be "15 seconds" and the second time period is set to be "5 minutes and 30 seconds."

When second area 105b or third area 105c of FIG. 13(a) is touched, the screen may be shifted to the screen shown in FIG. 13(b). In the screen shown in FIG. 13(b), the first time period or second time period can be set. For example, in the screen shown in FIG. 13(b), it is set to be "5 minutes and 30 seconds." When the "+" button is touched, the number increases by one. When the "−" button is touched, the number decreases by one. For example, when the "+" button displayed above "5" is touched, the number is switched from "5" to "6." When the "−" button displayed below "5" is touched, the number is switched from "5" to "4."

It should be noted that, although in the description above, in the case where the application program accompanied by information display is being executed, when an object approaches the display module, the turned-on display module is turned off, the display module may be turned off only when the application program accompanied by information display is executed and information corresponding to the application program is displayed on the display module.

It should be noted that the application accompanied by information display may include an application which switches and displays information all the time such as a widget.

In the description above, the case where touch panel 4 is touched with a finger is described. However, this similarly applies to the case where a stylus (input pen) is used in place of a finger.

The touch operation is not limited to the operation of directly touching touch panel 4 with a finger but also includes the operation of placing a finger close to touch panel 4. Not limited to the case where a user touches touch panel 4, also when a user (more specifically, a user's finger or the like) comes close to touch panel 4, touch detection module 13 may detect a position of a finger placed close in accordance with a change in a static capacitance, and output a position signal generated based on the detected touch position to control module 11.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A mobile terminal device, comprising:
  a display module configured to turn on and display information;
  a touch detection module including a touch panel and being configured to detect a touch operation of a user with respect to the touch panel; and
  a processor configured to:
  control the display module and the touch detection module,
  turn off the turned-on display module when an object approaches the display module in a case where an application program accompanied by information display is executed,
  determine if the application program corresponds to a first application program or a second application program;
  disable the touch operation after turning off the display module in a case where the application program corresponds to the first application program, and enable the touch operation after turning off the display module in a case where the application program corresponds to the second application program, wherein the first application program comprises a voice call program and the second application program is an application program that processes user inputs when the mobile terminal is in an unlocked state and is different from the first application program.

2. The mobile terminal device according to claim 1, the processor is configured to disable the touch operation when a predetermined time period has elapsed from turning off the display module in a case where the application program being executed is a predetermined application program corresponding to the second application program.

3. The mobile terminal device according to claim 2, wherein the predetermined time period is set in accordance with a kind of the application program being executed.

4. The mobile terminal device according to claim 1, wherein the processor is configured to turn off the turned-on display module and disable a touch operation after turning off when an object approaches the display module in a case where the application program is not executed.

5. The mobile terminal device according to claim 1, wherein the processor is configured to turn on the turned-off display module when the touch operation is detected within a predetermined time period after turning off the display module in a case where the application program corresponds to the second application program.

6. The mobile terminal device according to claim 1, wherein the first application program includes a character input application program, and
the processor is configured to, in the case where the character input application program is being executed and when an object approaches the display module, determine whether or not the touch operation is performed within a predetermined time period from the approach of the object, and turn off the turned-on display module in a case where the processor determines that the touch operation is not performed within the predetermined time period.

7. The mobile terminal device according to claim 1, comprising a proximity sensor configured to detect an approach of an object to the display module, wherein the processor is configured to turn off the turned-on display module when the processor determines that an object approaches the display module in accordance with a detection result of the proximity sensor.

8. The mobile terminal device according to claim 1, comprising an illumination sensor configured to detect illumination near the display module, wherein the processor is configured to turn off the turned-on display module when the processor determines that the illumination is lowered to a predetermined level in accordance with a detection result of the illumination sensor.

* * * * *